July 25, 1933.   H. A. DOUGLAS   1,919,207
AUTOMOTIVE VEHICLE SWITCHING MECHANISM
Filed Dec. 16, 1929   2 Sheets-Sheet 1
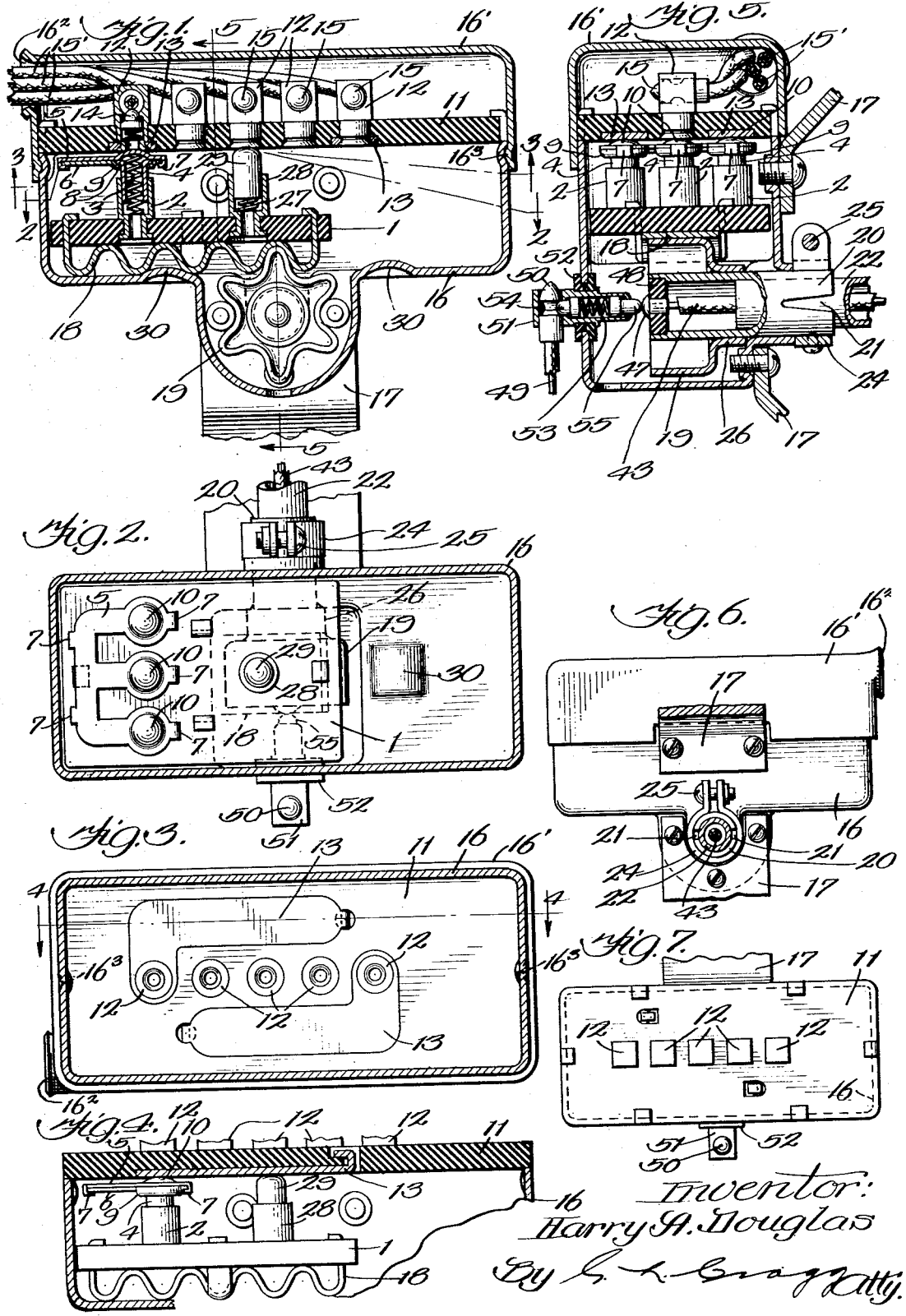
Inventor:
Harry A. Douglas July 25, 1933.  H. A. DOUGLAS  1,919,207
AUTOMOTIVE VEHICLE SWITCHING MECHANISM
Filed Dec. 16, 1929  2 Sheets-Sheet 2
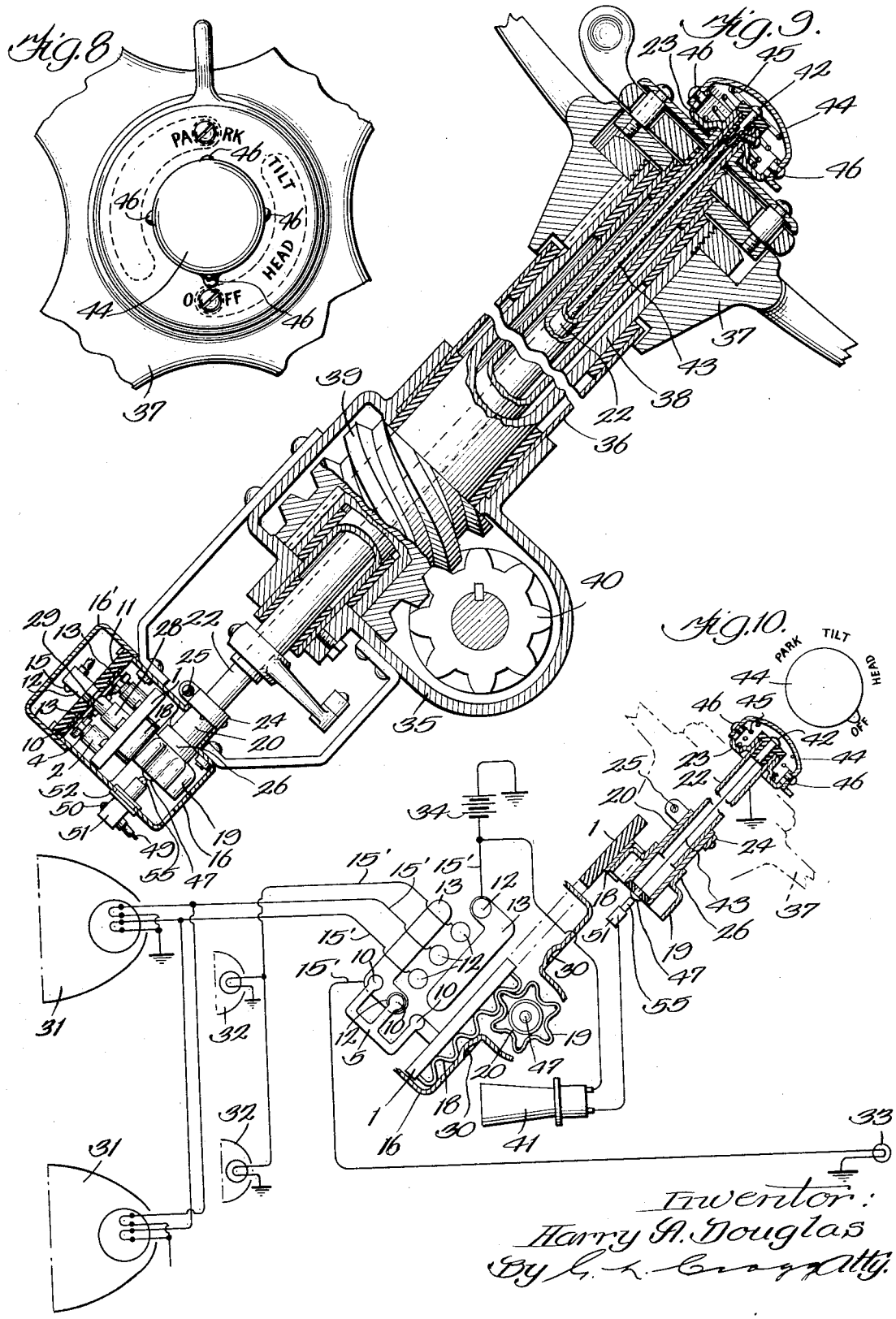
Inventor:
Harry A. Douglas
By G. L. Cragg, Atty.

Patented July 25, 1933

1,919,207

UNITED STATES PATENT OFFICE

HARRY A. DOUGLAS, OF BRONSON, MICHIGAN

AUTOMOTIVE VEHICLE SWITCHING MECHANISM

Application filed December 16, 1929. Serial No. 414,491.

My invention relates to automotive vehicles and electrical circuits associated therewith. In carrying out my invention I assemble the switching mechanism controlling the circuits of an automotive vehicle with the lower end of the stationary steering column and in a position to be free from access of foreign matter. The switching mechanism is provided with a casing and gearing within the casing for effecting the control of the switching mechanism, this gearing being coupled with an operating rod or shaft that passes through the steering column to a position at the steering hand wheel where such rod may be manipulated to turn it upon its axis and thereby effect the operation of the switching mechanism.

According to another feature of the invention the rod or shaft that operates the gearing is employed in effecting the circuit assembly of the horn. In practicing this feature of the invention such rod is desirably hollow and a conductor passes through it between the horn button at the hand steering wheel and the horn. In the preferred embodiment of the invention the electromagnetically operated horn is provided with a terminal that is located within the switch casing in such position as to be engageable by a contact that is assembled and coaxial with the rod or shaft that operates the gearing. The contact that is assembled with this rod or shaft is electrically connected with a push button contact that is mounted upon the steering hand wheel. This arrangement permits of the ready inclusion of the horn button in the push button circuit as a consequence of the assembly of the switch operating gearing within the switch casing. In order to simplify the connections between the contacts of the switching mechanism and other instrumentalities, such as the head lamps, parking lamps etc., I extend such contacts upwardly beyond the casing and provide a cap for the casing in which the extensions of these contacts are disposed. The wiring is led through an opening formed in the cap and is adapted for ready connection with the extensions of the switching contacts.

I will explain my invention more fully by reference to the accompanying drawings in which Fig. 1 is a sectional view illustrating the preferred form of switching mechanism employed in the construction of my invention; Fig. 2 is a sectional view on line 2—2 of Fig. 1; Fig. 3 is a sectional view on line 3—3 of Fig. 1; Fig. 4 is a sectional view on line 4—4 of Fig. 3; Fig. 5 is a sectional view on line 5—5 of Fig. 1; Fig. 6 is a side view with parts in section; Fig. 7 is a plan view with the cap for the casing removed; Fig. 8 is a plan view showing some of the parts which are located at the hand operated steering wheel; Fig. 9 is a view showing the assembly of the steering wheel, steering mechanism and contiguous parts, portions being broken away and portions being shown in section; and Fig. 10 is a diagrammatic illustration of one circuit arrangement to which the structure of my invention is adapted.

The switch illustrated has a member which is inclusive of a horizontally disposed insulating plate 1, spring barrels 2 assembled with this plate and projecting upwardly therefrom, a coiled spring 3 within each spring barrel, a tubular metallic member 4 also within each spring barrel and in sliding or telescopic relation thereto, each tubular member receiving the corresponding spring 3 therein and a resilient metallic contacting plate 5, which is fixedly secured to all of the tubular members 4 by means of a metallic assembling plate 6 to which the plate 5 is clinched, as indicated at 7. Each tubular member 4 is provided with a flange 8 which is interposed between the plates 5 and 6 and is clamped in place by means of the shoulder 9 which holds the flange against the plate 5. The plate 5 is upwardly bulged at each place thereof that is in alignment with the parts 2, 3 and 4, as indicated at 10, these bulging portions constituting contacting parts. The plates 5 and 6 are of similar fork shape, one plate being placed upon and in register with the other. These plates 5 and 6 are of spring metal, preferably brass, so that the branches of the fork are relatively flexible to permit the contacts 10 to ride over parts engaged thereby, in the operation of the switch, the contacts 10 thus shaping themselves to non-coplanar parts engaged thereby without danger of separating these contacts from parts which they should engage. The other switch member is inclusive of another insulating plate 11, metallic spring barrels 12 mounted upon and projecting upwardly from the plate 11 and metallic contacting bars 13 which are mechanically and electrically united with the two end spring barrels 12. The bars 13 are received within recesses formed within the bottom side of the plate 11. The upwardly spring pressed contacts 14 are received within the barrels 12 and project into the spaces in the enlarged upper ends or extensions of the barrels 12 that receive the metallic terminal plugs 15, which are engaged by the contacts 14.

The bottom ends of the spring barrels 12 are formed with cavities which are adapted to receive the contacts 10, as will later more fully appear. The insulating plate 1 and the parts thereon are rectilineally movable to bring the contacts 10 into and out of engagement with the barrels 12. These contacts, being upon the outer ends of the branches of the fork shaped member, are adapted to rise and fall relatively as they move into and out of engagement with the barrels 12 that thus constitute contacts complemental to the contacts 10. These contacts are arranged in a straight row and the barrel contacts 12 are also arranged in a straight row, the two rows being in similar direction and in lapping relation. One of the bars 13 may constitute a tail light terminal and the other a battery terminal, the intervening spring barrels constituting head light, dimming and parking light contacts all diagrammatically indicated in Fig. 10.

The switch illustrated may be provided with a casing 16 of which the insulating plate 11 constitutes a closure. This casing encloses the plate 1 and the parts assembled therewith, but leaving the upper ends or extensions of the spring barrels 12 upon the exterior of the casing. I provide a cap 16' for the casing, as a whole, this cap serving to protect the upper ends of the spring barrels 12 and the plugs 15 that are received in these spring barrel ends. The conductors 15' which extend between the plugs 15 and the parts whose circuit associations are to be governed by these plugs are passed through an opening 16² formed in the cap 16'. The cap has groove and spring tongue assembly with the body of the casing 16 as indicated at 16³.

Mounting brackets 17 are secured to the casing and serve to mount the same upon the steering gear housing that is assembled with the steering column as will more fully appear.

The mechanism for moving the movable switch member is desirably inclusive of a rack 18 that is formed of a strip of metal which is sinuously curved to form the rack teeth. This rack is desirably carried by the plate 1. A pinion 19 is in mesh with the rack. The casing 16 also encloses said gear elements. A tubular hub 20, formed of resilient metal, is notched, as indicated at 21, to make it contractible. The switch operating rod or shaft 22 is provided with a suitable operating means such as the lever 23 and is passed through an opening, which is formed in the casing 16, and into the hub. A clamping collar 24 embraces the hub and clamps it into engagement with the shaft to prevent inward movement of the shaft. This clamping collar is equipped with a suitable clamping screw 25. Outward movement of the shaft is prevented by the engagement of the hub enlargement 26 with the inner side of the casing 16. The gear 19 is thus confined to a fixed plane of rotation. In order that the pinion may be readily assembled the combined axial length thereof together with its hub is less than the space between the side walls of the casing 16, so that said hub may be dropped into alignment with an opening in the casing that receives it, when the insulating plate 11 is not in position. The portions of the casing through which the hub 20 passes are laterally deflected and extended as illustrated in Fig. 5 to form a bearing for the hub.

The springs in the barrel 2 take part in leveling the plate 1. An additional leveling spring 27 is interposed between and presses upon both of the switch members, the spring 27 being contained within a spring barrel 28 which is assembled with the insulating plate 1. A plunger 29 is telescopically received within the spring barrel 28 and is pressed against the insulating plate 11, or the contacting ends of the spring barrels 12, according to the position in which the plate 1 is placed upon its rectilineal movement that is caused by rotation of the pinion 19. The spring 27 and the parts through which it exerts its pressure are mounted apart from the contacts 10, that is upon one side of this row of contacts, so that it readily cooperates with the springs 3 in the barrels 2 to maintain the plate 1 level throughout the entire range of rectilineal movement thereof.

The cavities in the bottom faces of the barrels 12 serve to hold the plate 1 and the parts thereon in position when the current conducting contacts are in engagement. Detents 30, which are desirably inwardly bulged portions of the casing 16, enter spaces between the rack teeth to hold the plate 1 in position when the switch is in circuit opening adjustment. These detents may also take part in holding the plate 1 in position when the switch is in circuit closing adjustment.

The conductors 15' respectively extend to the main and tilting filaments of the head lamps 31, the parking lamps 32, the tail lamp 33 and the battery 34 all as indicated most clearly in Fig. 10. The supporting brackets 17 for the switch casing 16 are carried upon the steering gear casing 35 in such a manner as to place the closure plate 11 of the casing 16 uppermost, whereby the switch contacts are located above the pinion 19 and the bottom of the casing so as to be relieved of the material access of foreign matter thereto.

The rod or shaft 22 is coaxial with the inclined stationary steering column 36. The steering hand wheel 37 is also coaxial with the steering column being mounted thereabove. This steering hand wheel is coupled with a hollow shaft 38 which carries the worm gear 39 that is in mesh with the pinion 40 which is in suitable guiding relation to the steering vehicle wheels, in the case of a land vehicle or other steering means in the cases of other vehicles. The rod or shaft 22 terminates at the top side of the hand wheel 37 and is there coupled with the lever 23 which is upon the top side of the steering wheel 37.

The electromagnetically operated horn 41 has one terminal grounded through the battery 34 and has its other terminal connected with a contact 42 which is carried by and insulated from the hollow shaft or rod 22, a conductor 43, taking part in connecting the contact 42 with the horn, passing through the hollow shaft 22. A push button 44 is provided upon the top side of the wheel 37 to be engageable with the contact 42 from which it is normally spaced apart by the coiled spring 45. The push button 44 may also be employed to turn the lever 23 to turn the pinion 19. To this end the push button may carry pins 46 which extend into slots that are formed in the lever 23 lengthwise of the shaft 22, an assembly which permits the push button to be operated to sound the horn without actuating the shaft 22 and to be turned, to turn said shaft, without operating the horn. The lower end of the conductor 43 is assembled with a contact 47 which is carried in the insulating closure or contact carrier 48 that is carried by the hollow shaft 22 and serves as a closure therefor to prevent foreign matter from passing through the shaft into the casing 16. A flexible conductor 49 extends from the horn and terminates in a plug 50. This plug is receivable within an opening formed in the outer end of a spring barrel or circuit connector 51 which passes through the casing 16 and is assembled therewith by two opposed insulating discs 52 which are clamped between shoulders upon said spring barrel and which discs clamp the adjacent portion of the casing 16 therebetween. A coiled spring 53 is located within the spring barrel 51 and is interposed between plunger contacts 54 and 55. The contacts 54, 55 and 47 are in line with each other and are preferably located upon the axis of the shaft 22. The coiled spring 53 projects the contact 54 into the space that receives the plug 50, whereby the horn is electrically connected with the spring barrel 51 and both contacts 54 and 55. The contact 55 is spring pressed into engagement with the contact 47 whereby the horn is connected with the conductor 43 and, through this conductor, with the push button contact 42. The connection of the horn with the push button contact 42 is automatically accomplished when the pinion 19 is assembled with the casing 16, as hitherto described. I have not deemed it necessary to describe more of the construction that is shown within and in association with the steering column 36, as such is so well known to those skilled in the art, to whom it would be apparent that the various characteristics of my invention materially improve the switching mechanism that is employed in conjunction with the steering columns and hand operated steering wheels of automotive vehicles.

Changes may be made without departing from the invention.

Having thus described my invention, I claim:

1. In a switching mechanism, the combination with a metallic casing; of a pair of insulating plates received therein, one of said plates being fixed in the casing and the other movable in a plane parallel to the first plate; a rack fixed to said second plate upon its side opposite the first plate, said rack having sliding engagement with a wall of the casing; inwardly bulged portions of said wall frictionally engaging the rack to determine respective positions of the movable plate; a recess in said wall; a pinion in said recess in engagement with said rack; triangularly related springs compressed between the plates and pressing the movable plate into engagement with said wall and said pinion; fixed contacts on said fixed plate; and spring pressed complementary contacts on said movable plate selectively engageable with said fixed contacts upon rotation of the pinion to move said movable plate.

2. The structure of claim 1 wherein the pinion is hollow and carries an insulated contact centrally thereof and wherein the casing wall carries an insulated spring barrel axially aligned with said central contact and oppositely directed spring pressed contacts are carried by said barrel, one upon the interior and the other upon the exterior of said casing, said contact upon the interior of the casing having resilient frictional abutment with said central contact.

3. The structure of claim 1 wherein the pinion is hollow and carries an insulated contact centrally thereof, wherein the casing wall carries an insulated spring barrel axially aligned with said central contact and oppositely directed spring pressed contacts are carried by said barrel, one upon the interior and the other upon the exterior of said casing, said contact upon the interior of the casing having resilient frictional abutment with said central contact, and wherein a plug receiving socket is carried by the spring barrel upon the exterior of the casing and said socket receives a conductor terminal plug having yieldable engagement with the contact carried by the spring barrel upon the exterior of the casing.

HARRY A. DOUGLAS.